United States Patent Office 2,745,319
Patented May 15, 1956

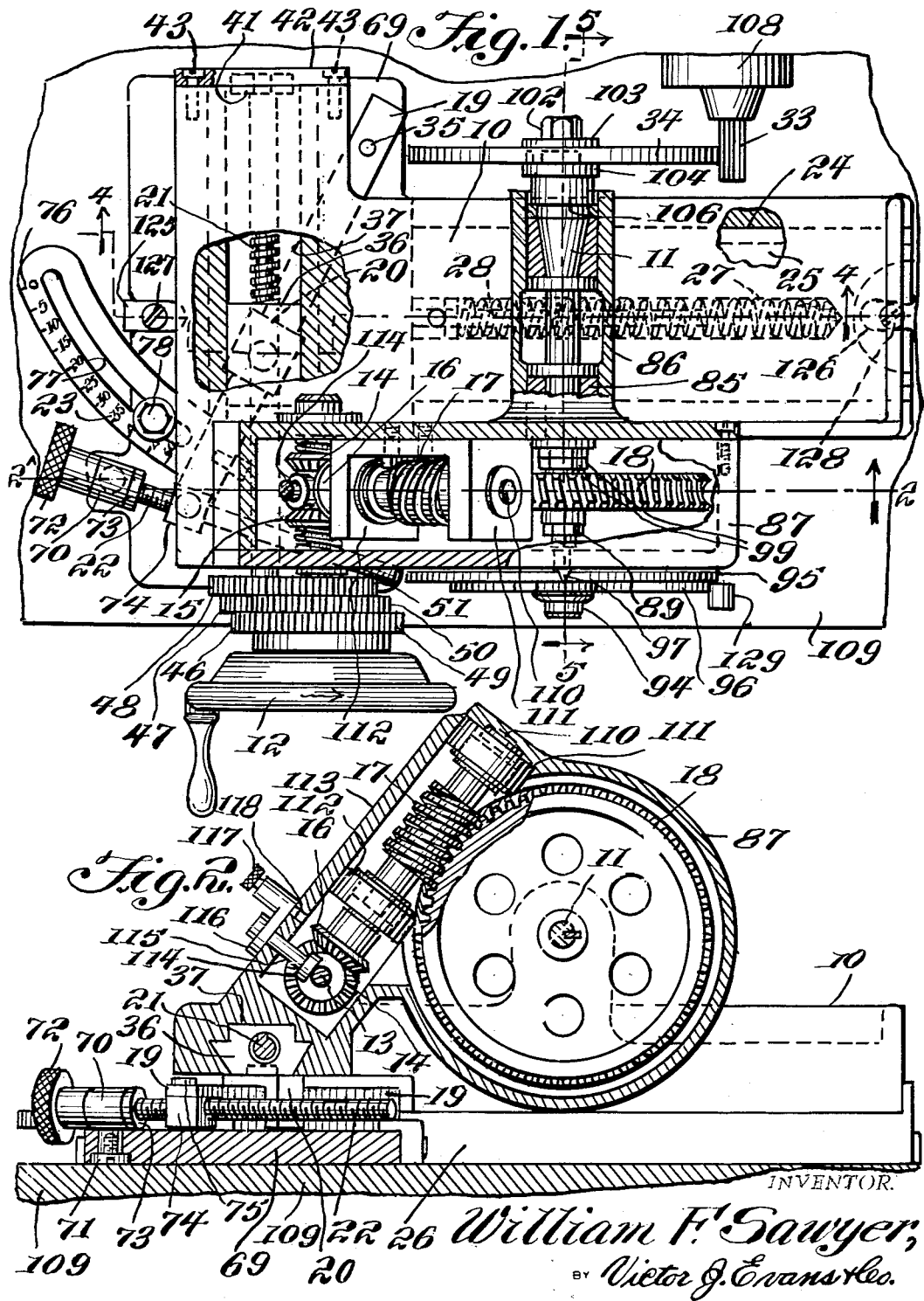

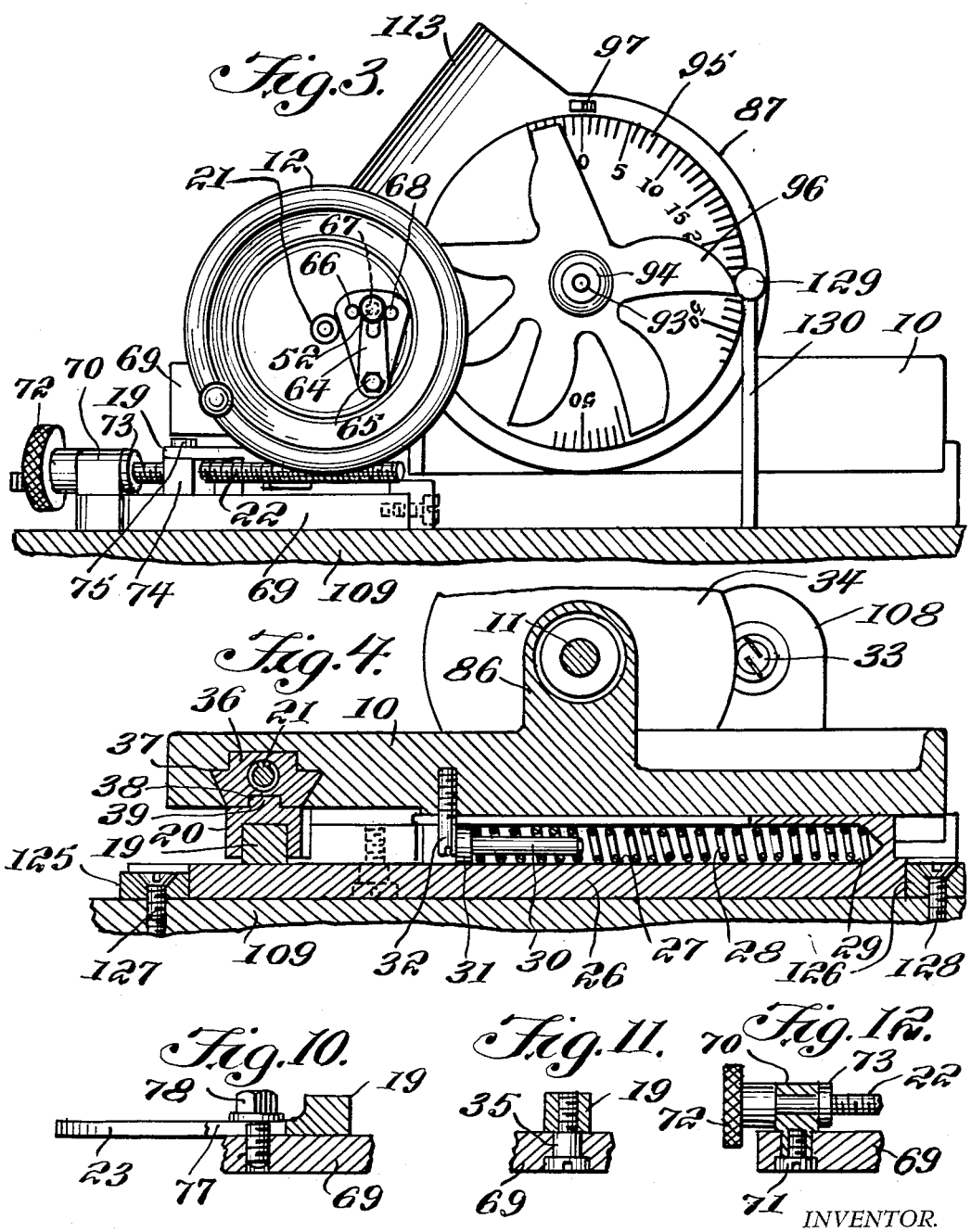

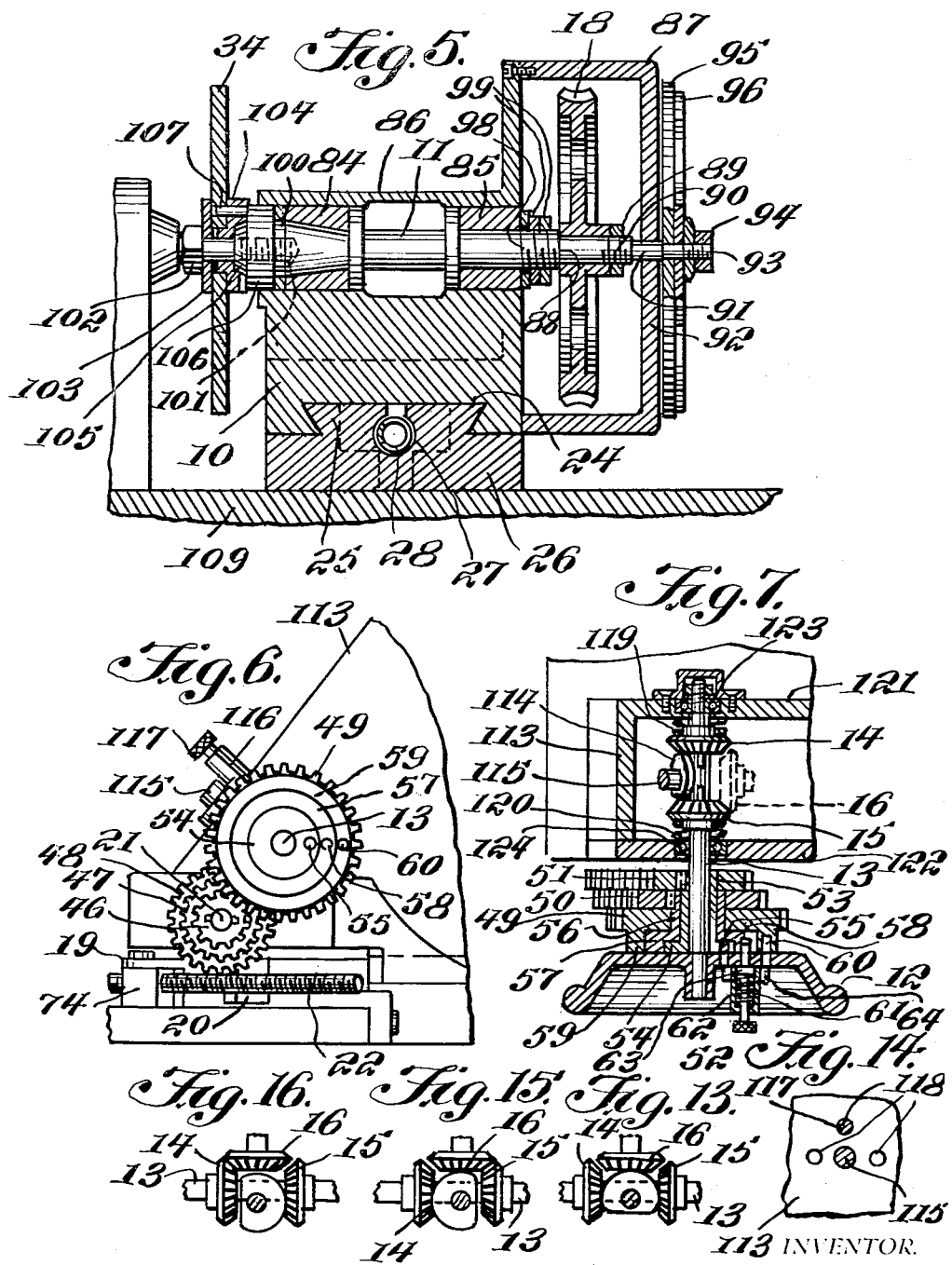

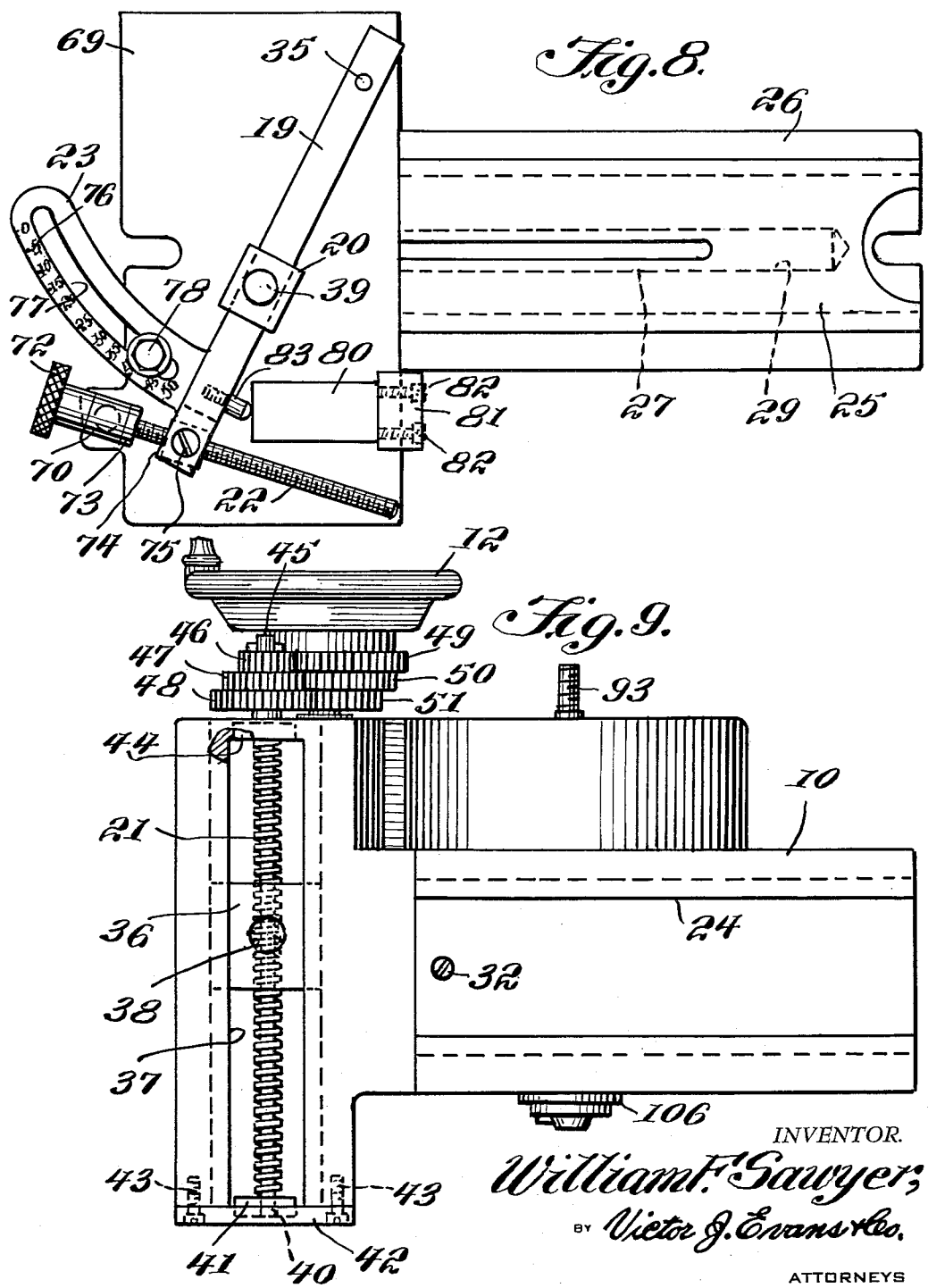

2,745,319

CAM MILLING ATTACHMENT FOR MILLING MACHINES

William F. Sawyer, Brighton, Mich.

Application January 14, 1953, Serial No. 331,276

3 Claims. (Cl. 90—13.9)

This invention relates to cam cutting and milling jigs and tools, and in particular a cam milling attachment adapted to be used on plain or universal milling machines whereby a true, uniform lead may be milled on cams on the flat or Brown and Sharp type.

The purpose of this invention is to provide mechanical means in a cam cutting or milling attachment whereby a blank mounted on a spindle having a master cam or template thereon may be actuated in relation to a cutter to correspond with a knob, aligned with the cutter and following the template whereby a cam may be milled with precision.

It is difficult to duplicate cams because with the conventional type of tool or work holder there is not sufficient flexibility of travel between the cutting tool and material from which the cam is cut to accurately follow an uneven surface and to adjust the parts for a precision job requires the services of an expert. Furthermore, in the conventional method of milling a cam a layout of the cam surface is required on the blank from which the cam is cut and for precision work this also requires the services of an expert.

With this thought in mind this invention contemplates a cam milling attachment comprising a spindle journaled on a slide with the travel of the slide controlled by a follower on a sine bar and with the spindle rotated by a hand wheel whereby a master cam or template is adapted to be actuated with the cam service following a stationary knob aligned with a cutter and mounted on a machine on which the attachment is positioned.

The object of this invention is to provide an attachment for milling machines wherein a blank is actuated to cutting position in relation to a milling cutter to correspond with a master cam or template through mechanically operated elements.

Another object of the invention is to provide means for cutting a cam with a milling cutter whereby a layout on the blank from which the cam is to be cut is not necessary.

A further object of the invention is to provide a cam milling attachment for milling machines with which cams of odd shapes may be cut with accuracy in which the attachment is of a simple and economical construction.

With these and other objects and advantages in view the invention embodies a horizontal disposed slide positioned to travel in a plane perpendicular to the axis of a cutter of a milling machine, a sine bar pivotally mounted on the machine bed and having a follower thereon which is pivotally connected to the slide, providing means for adjusting the position of the sine bar, a spindle journaled on the slide and having means for mounting a blank on one end and a master cam or template on the other, and a hand wheel actuated gear assembly for, simultaneously, actuating the slide and rotating the spindle.

Other features and advantages of the invention will appear for the following description taken in connection with the drawings, wherein:

Figure 1 is a plan view of the attachment showing the device on a milling machine bed with parts of the device broken away and other parts shown in sections.

Figure 2 is a vertical section taken on line 2—2 of Figure 1 showing the worm gears for rotating the spindle and the adjusting screw for setting the cam bar.

Figure 3 is the front elevational view of the attachment showing a point and a scale disc on which hundreds and degrees are provided and illustrating a template positioned on the end of the spindle.

Figure 4 is a longitudinal section through the slide taken substantially on line 4—4 of Figure 1 also showing the sine bar and follower.

Figure 5 is the cross section through the slide taken on line 5—5 of Figure 1 illustrating the mounting of the spindle.

Figure 6 is a section taken substantially on line 6—6 of Figure 1 illustrating the gear assembly for actuating the slide and spindle at different proportionate speeds.

Figure 7 is a sectional plan taken on line 7—7 of Figure 3 illustrating the train of gears with the means for selectively connecting the gears to the cam wheel and also showing the bevel gears for rotating the spindle through the worm.

Figure 8 is a plan view of the lower part of the slide showing the sine bar with the clamping means, adjusting screw and gage block with which the sine bar is adjustably mounted on the bed on the milling machine.

Figure 9 is a view looking upwardly toward the under side of the slide of the attachment.

Figure 10 is a detail showing a section through the graduated scale mounting with which the sine bar is set to adjusted positions.

Figure 11 is a detail showing a section taken on line 11—11 of Figure 1 showing the pivotal mounting of the sine bar to the mounting plate.

Figure 12 is a detail showing a section taken on line 12—12 of Figure 1 illustrating the mounting of the sine bar adjusting screw.

Figure 13 is a detail illustrating an arrangement of bevel gears for actuating the worm gears of the spindle mounting showing an operating gear thereof in the neutral position.

Figure 14 is a detail illustrating different positions of an adjustable handle for operating the bevel gears.

Figure 15 is a detail similar to that shown in Figure 13 showing the cam positioned to hold a gear on one side of the assembly away from the driving gear.

Figure 16 is a similar detail showing the gear on the opposite side of the assembly held away from the driving gear.

Referring now to the drawings wherein like reference characters denote corresponding parts the improved cam milling attachment of this invention includes a base or slide 10, a spindle 11 journaled on the slide, a hand wheel 12 mounted on a hand wheel shaft 13 for rotating the spindle through bevel gears 14, 15 and 16 with a worm 17 and a worm gear 18, a sine bar 19 having a follower 20 thereon, a threaded rod 21 extended through the follower and actuated from the shaft 13 through a gear assembly, an adjusting screw 22 for adjusting the position of the sine bar, and a graduated scale 23 for setting the sine bar.

The slide 10 is provided with a dovetail slot 24 in the under surface which receives a tongue 25 of a base 26 and, as shown in Figures 4 and 5, the base is provided with an elongated opening 27 in which a spring 28 is positioned. One end of the spring is positioned in a socket 29 in the base 26 and the opposite end is held by a pin 30 having a head 31 through which tension of the spring is applied to a stud 32 extended downwardly from the slide 10, thereby providing means for returning the slide after a cutter 33 has milled a slot or dwell in a cam, as indicated by the No. 34.

The spindle 11 on which the blank 34 is carried is moved toward the cutter 33 by the hand wheel 12 through the action of the follower 20 sliding on the sine bar 19 and with the follower moving toward the pivot 35 of the sine bar the spindle moves toward the cutter and with the follower moving away from the pivot the spindle and blank 34 move away from the cutter.

The follower 20 is actuated by the threaded rod 21 which is threaded in a traveling block 36 slidably mounted in a slot 37 in the slide 10. The block 36 is provided with a recess 38 in which a pin 39 on the follower 20 is positioned.

One end of the rod 21 is provided with a pin 40 that is threaded in a bearing 41 in a plate 42 that is secured to one end of the slide 10 with bolts 43 and the opposite end of the rod is journaled in a bearing 44 at the front of the slide. The end 45 of the rod, which extends through the bearing, 44 is provided with gears 46, 47 and 48 that mesh with gears 49, 50 and 51 on the shaft 13 on which the hand wheel 12 is mounted. By this means the hand wheel rotates the rod 21, selectively, at different speeds through the gear assembly.

As illustrated in Figure 7 the gears 49, 50 and 51 are, selectively, engaged with the hand wheel 12 by a spring actuated pin 52. The gear 51 is mounted on a sleeve 53 having a flange 54 and the flange is provided with an opening 55 into which the inner end of the pin 52 extends when it is desired to engage the hand wheel with the gear 51.

The gear 50 is mounted on a sleeve 56 also having a flange 57 on one end and the flange is provided with an opening 58 that is positioned to receive the pin 52. The gear 49 is provided with an annular rim 59 in which an opening 60 is provided for receiving the pin 52.

The pin 52 is resiliently held inwardly by a spring 61 in a casing or cup 62, the inner end of the spring bearing against the collar 63 carried by the pin 52.

The cup 62 in which the pin 52 is mounted is carried by a spring arm 64 that is pivotally mounted on a pin 65, as shown in Figure 3 and by this means the pin 52 is adapted to be inserted through openings 66, 67 and 68 to correspond with the openings 55, 58 and 60 of the flanges of the gears 51 and 50 and the rim of the gear 49.

The sine bar 19 is pivotally mounted by the pin 35 on the section 69 of the base 26 and the sine bar is actuated by the adjusting screw 22 which is mounted in a bearing 70 on the base with a screw 71, as shown in Figure 12, and the screw is actuated by a knob or head 72 at one side of the bearing. The screw is held by a collar 73 on the opposite side of the bearing and, as shown in Figure 2, the screw extends through a block 74 that is secured to the end of the sine bar 19 with a screw 75.

The sine bar 19 is also provided with the arcuate arm 23 having a slot 77 therein and a bolt 78 extended through the slot 77 and threaded into an opening 79 in the section 69 of the slide provides means for clamping the sine bar in adjusted positions. One edge of the arcuate arm 23 is provided with graduations 76 to facilitate threading the sine bar to different degrees.

By this means the sine bar is set whereby upon longitudinal movement of the slide on the bed of the machine the follower slides on the sine bar thereby controlling the movement of the slide.

To further facilitate accurately positioning the sine bar 19 a gage block 80 is provided and with the gage block positioned against a stop 81 secured to the section 69 of the slide by screws 82 a stud 83, which is threaded in one side of the sine bar engages the end of the gage block to definitely locate the sine bar and follower.

The spindle 11 is journaled by bearings 84 and 85 in a substantially U-shape section 86 of the slide 10 and, as illustrated in Figure 5, the worm gear 18, which is positioned in a gear housing 87 at one end of the section 86 of the slide, is locked against the shoulder 88 of the spindle with a lock nut 89 that is threaded on a section 90 of the spindle. The diameter of the section 90 of the spindle is less than that of the body of the spindle and from the section 90, a section 91 of a still smaller diameter extends from the end of the spindle through a wall 92 of the gear housing 87. The extended end 93 of the spindle on which a lock nut 94 is threaded extends through the wall 92 and a graduated disc 95 is secured on the section 93 with a template 96 positioned to coact with a pointer 97 on the face of the wall 92.

The spindle 11 is also provided with a threaded section 98 on which lock nuts 99 are threaded.

The opposite end 100 of the spindle 11 is provided with a threaded socket 101 into which a bolt 102 extends and, as illustrated in Figure 5, a blank 34, from which it is desired to cut a cam is positioned between lock washers 103 and 104, the washer 104 having a recess which extends over an extended portion 105 of a section 106 at the end of the spindle. The section 106 is provided with a pin 107 that extends through the washer 104 and into the blank 34 to position the blank, and also to retain the blank in a fixed position as it is being milled to form a cam.

By this means the blank 34 is positioned to coact with a cutter, as indicated by the numeral 33, and which is journaled in and rotated by a milling machine, as indicated by the numeral 108. The milling machine is also provided with a bed 109 upon which the base 26 is positioned.

The spindle 11 is rotated by the hand wheel 12 through the gear assembly with the worm gear 18, fixedly mounted on the spindle rotated by the worm 17 on a stub shaft 110, which is journaled in bearings 111 and 112 of a section 113 of a gear housing and, as illustrated in Figures 2 and 7, the bevel gear 16 is mounted on the lower end of the stub shaft 110. The end sections of the hub of the worm 17 position the worm between the bearings 111 and 112.

The bevel gear 16 is positioned between the gears 14 and 15 on the shaft 13 and, as illustrated in Figures 13, 15 and 16 the bevel gears 14 and 15 are actuated by a cam 114 on a pin 115. The pin 115 is rotated by an arm 116 which is provided with a spring actuated pin 117 that is positioned to extend into openings 118 in the section 113 of the gear housing, and by turning the arm 116 with the spring pin 117 withdrawn the cam 114 may be adjusted whereby both of the gears 14 and 15 are spaced from the gear 16, as shown in Figure 13, whereby the gear 14 is spaced from the gear 16 and the gear 15 is in mesh with the gear 16, as shown in Figure 15, or whereby the gear 15 is spaced from the gear 16 and the gear 14 is in mesh with the gear 16 as shown in Figure 16.

By this means the bevel gears are adapted to be set to a neutral position whereby the slide may be actuated without rotating the spindle of the cam and also to positions whereby the direction of travel of the slide may be reversed.

The bevel gears 14 and 15 are slidably mounted on the shaft 13, as illustrated in Figure 7 and these gears are urged into meshing relation with the gear 16 by springs 119 and 120, which bear against inner surfaces of side walls 121 and 122 of the section 113 of the gear housing, and against the hubs of the gears, whereby the gears are resiliently held against the face of the cam 114. The side walls 121 and 122 are provided with bearings 123 and 124, respectively by which the shaft 13 is journaled in the housing.

The base 26 upon which the slide 10 is mounted is positioned on the bed of a machine with the ends held by clamps 125 and 126 having screws 127 and 128 therein, as illustrated in Figure 1, and with the parts in position the attachment is mounted whereby the stationary knob 129 on an arm 130 engages the surface of a template, as indicated by the numeral 96 and whereby a blank 34 is positioned to be engaged by a cutter 33.

With the parts as disclosed and described the spindle is actuated by the hand wheel 12 so that the surface of the cam 96 slides against the knob 129 and in this movement a similar surface is cut by the cutter 33 on the blank 34.

The travel of the slide is controlled by the gear assembly and by adjusting the position of the pin 52. The follower 20 is moved in proportion to the rotation of the spindle whereby the travel of the slide 10 is in proportion to the rotation of the spindle.

By adjusting the angle of the sine bar 19 and the proportionate speed of the spindle and slide it is possible to cut arcuate or flat surfaces on the cam and, therefore, it is possible to cut a cam to the exact form of a template.

It will be understood that modifications, within the scope of the appended claims, may be made in the design and arrangement of the parts without departing from the spirit of the invention.

What is claimed is:

1. In a cam cutting attachment for a milling machine, the combination which comprises a base having a longitudinally disposed dove-tail groove in the under surface, said groove being adapted to receive a tongue of a conventional milling machine bed, a horizontally disposed cam carrying spindle rotatably mounted in said base, means for clamping a pattern on one end of the spindle, means for clamping a blank on the end of the spindle opposite to the end on which the pattern is positioned, said spindle positioning the blank in cutting relation to a milling cutter of a machine, a hand wheel shaft positioned parallel to and spaced from the spindle, said hand wheel shaft being rotatably mounted on said base, a hand wheel on the hand wheel shaft, a stub shaft extended from the hand wheel shaft to a point above the spindle, a worm gear on the spindle, a worm on the stub shaft positioned in meshing relation with the worm gear of the spindle, and means for advancing the base whereby the cam blank follows the outline of the pattern upon rotation of the spindle by the hand wheel.

2. In a cam cutting attachment for a milling machine, the combination which comprises a base having a longitudinally disposed dove tail groove in the under surface, said groove being adapted to receive a tongue of a conventional milling machine bed, a horizontally disposed cam carrying spindle rotatably mounted in said base, means for clamping a pattern on one end of the spindle, means for clamping a blank on the end of the spindle opposite to the end on which the pattern is positioned, said spindle positioning the blank in cutting relation to a milling cutter of the machine, a hand wheel shaft positioned parallel to and spaced from the spindle, said hand wheel shaft being rotatably mounted in said base, a hand wheel on the hand wheel shaft, a stub shaft extended from the hand wheel shaft to a point above the spindle, a worm gear on the spindle, a worm on the stub shaft positioned in meshing relation with the worm gear of the spindle, a sine bar pivotally mounted on the bed of the machine, means for adjusting the angular relation of the sine bar to the base, and a follower carried by the base and slidably mounted on the sine bar for advancing the base whereby the cam blank follows the outline of the pattern upon rotation of the spindle.

3. In a cam cutting attachment for a milling machine, the combination which comprises a base having a longitudinally disposed dove tail groove in the under surface, said groove being adapted to receive a tongue of a conventional milling machine bed, a horizontally disposed cam carrying spindle rotatably mounted in said base, means for clamping a pattern on one end of the spindle, means for clamping a blank on the end of the spindle opposite to the end on which the pattern is positioned, said spindle positioning the blank in cutting relation to a milling cutter of the machine, a hand wheel shaft positioned parallel to and spaced from the spindle, said hand wheel shaft being rotatably mounted on said base, a hand wheel on the hand wheel shaft, a stub shaft extended from the hand wheel shaft to a point above the spindle, a worm gear on the spindle, a worm on the stub shaft positioned in meshing relation with the worm gear of the spindle, a sine bar adapted to be pivotally mounted on the bed of the machine, an adjusting screw for moving one end of the sine bar in relation to the base, a follower slidably mounted on the sine bar, a screw rotatably mounted in the base and extended through said follower, a train of gears mounted on the screw and hand wheel shaft for rotating the screw at different speeds in relation to the speed of the spindle, and a graduated wheel extending from one side of the sine bar to facilitate setting the sine bar in different positions.

References Cited in the file of this patent

UNITED STATES PATENTS

| | | |
|---|---|---|
| 1,689,370 | Tessky | Oct. 30, 1928 |
| 1,770,498 | Spatenga | July 15, 1930 |
| 2,386,973 | Mieth | Oct. 16, 1945 |
| 2,471,493 | Norton | May 31, 1949 |
| 2,507,547 | Shephard | May 16, 1950 |
| 2,534,231 | Christian et al. | Dec. 19, 1950 |

FOREIGN PATENTS

| | | |
|---|---|---|
| 536,272 | France | Apr. 29, 1922 |